US012708850B2

(12) United States Patent
Bean et al.

(10) Patent No.: US 12,708,850 B2
(45) Date of Patent: Aug. 18, 2026

(54) SYSTEMS AND METHODS FOR TESTING AN NPC

(71) Applicant: Sony Interactive Entertainment Inc., Tokyo (JP)

(72) Inventors: Celeste Bean, San Francisco, CA (US); Tooba Ahsen, Sunnyvale, CA (US); Kristie Ramirez, San Jose, CA (US); Victoria Dorn, Hayward, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 396 days.

(21) Appl. No.: 18/482,004

(22) Filed: Oct. 5, 2023

(65) Prior Publication Data

US 2025/0114708 A1 Apr. 10, 2025

(51) Int. Cl.
*A63F 13/58* (2014.01)
*A63F 13/67* (2014.01)

(52) U.S. Cl.
CPC .............. *A63F 13/58* (2014.09); *A63F 13/67* (2014.09); *A63F 2300/65* (2013.01)

(58) Field of Classification Search
CPC ................................. A63F 13/58; A63F 13/60
See application file for complete search history.

(56) References Cited

U.S. PATENT DOCUMENTS

2016/0332081 A1* 11/2016 Marr ....................... A63F 13/60
2020/0197811 A1* 6/2020 Eatedali .................. A63F 13/67
2020/0298118 A1* 9/2020 Yannakakis ............ G06N 20/10
2020/0298128 A1* 9/2020 Yannakakis ............. A63F 13/79
2021/0146254 A1* 5/2021 Snodgrass ................ G06N 3/08
2022/0054943 A1* 2/2022 Wu ........................ G06N 3/092
2022/0379217 A1* 12/2022 Kerber ................... G06N 3/006
2024/0382854 A1* 11/2024 Pedersen ................ A63F 13/67

OTHER PUBLICATIONS

"AI Npcs and the Future of Gaming", Available Online at: https://inworld.ai/blog/ai-npcs-and-the-future-of-video-games, Sep. 21, 2023, 13 pages.

(Continued)

*Primary Examiner* — Jay Trent Liddle

(74) *Attorney, Agent, or Firm* — Kilpatrick Townsend & Stockton LLP

(57) ABSTRACT

Systems and methods for testing a non-player character (NPC) for use in a video game are described. One of the methods includes generating parameters that define characteristics of the NPC. The characteristics include data that define visual features for the NPC, physical features for the NPC, and context features for a test video game for the NPC. The method further includes providing the parameters to an artificial intelligence (AI) model. The method includes activating an interactive version of the NPC in the test video game and introducing a quality assurance NPC into the test video game. The quality assurance NPC is programmed to interact with the interactive version of the NPC in the test video game and generate test metrics regarding the interaction. The method includes modifying the interactive version of the NPC responsive to the test metrics.

20 Claims, 6 Drawing Sheets

(56) References Cited

OTHER PUBLICATIONS

"Artificial Intelligence in Video Games—Saagie", Available Online at: https://www.saagie.com/en/blog/artificial-intelligence-in-video-games/, Nov. 10, 2020, 98 pages.
"What is a Character Engine? It's a Game Engine for AI NPCS", Inworld Team, Available Online at: https://inworld.ai/blog/what-is-a-character-engine-a-game-engine-for-ai-npcs, Sep. 20, 2023, 10 pages.
Gutierrez-Sanchez, et al., "Reinforcement Learning With Temporal Logic Specifications for Regression Testing Npcs in Video Games", 2023 Institute of Electrical and Electronics Engineers Conference on Games (CoG), Aug. 21-24, 2023, 8 pages.
Park, et al., "Generative Agents: Interactive Simulacra of Human Behavior", UIST '23: Proceedings of the 36th Annual Association for Computing Machinery Symposium on User Interface Software and Technology, Oct. 29, 2023, 22 pages.
Shams, et al., "Towards a Holodeck-style Simulation Game", Available Online at: https://arxiv.org/abs/2308.13548, Sep. 13, 2023, 18 pages.
Soares, et al., "Deep Variational Autoencoders for Npc Behaviour Classification", 2019 Institute of Electrical and Electronics Engineers Conference on Games (CoG), Aug. 20-23, 2019, 4 pages.
Togelius, et al., "Improving QA Game Testing with Evolved AI", Available Online at: https://www.gamedeveloper.com/programming/improving-qa-game-testing-with-evolved-ai, Nov. 15, 2022, 14 pages.

* cited by examiner

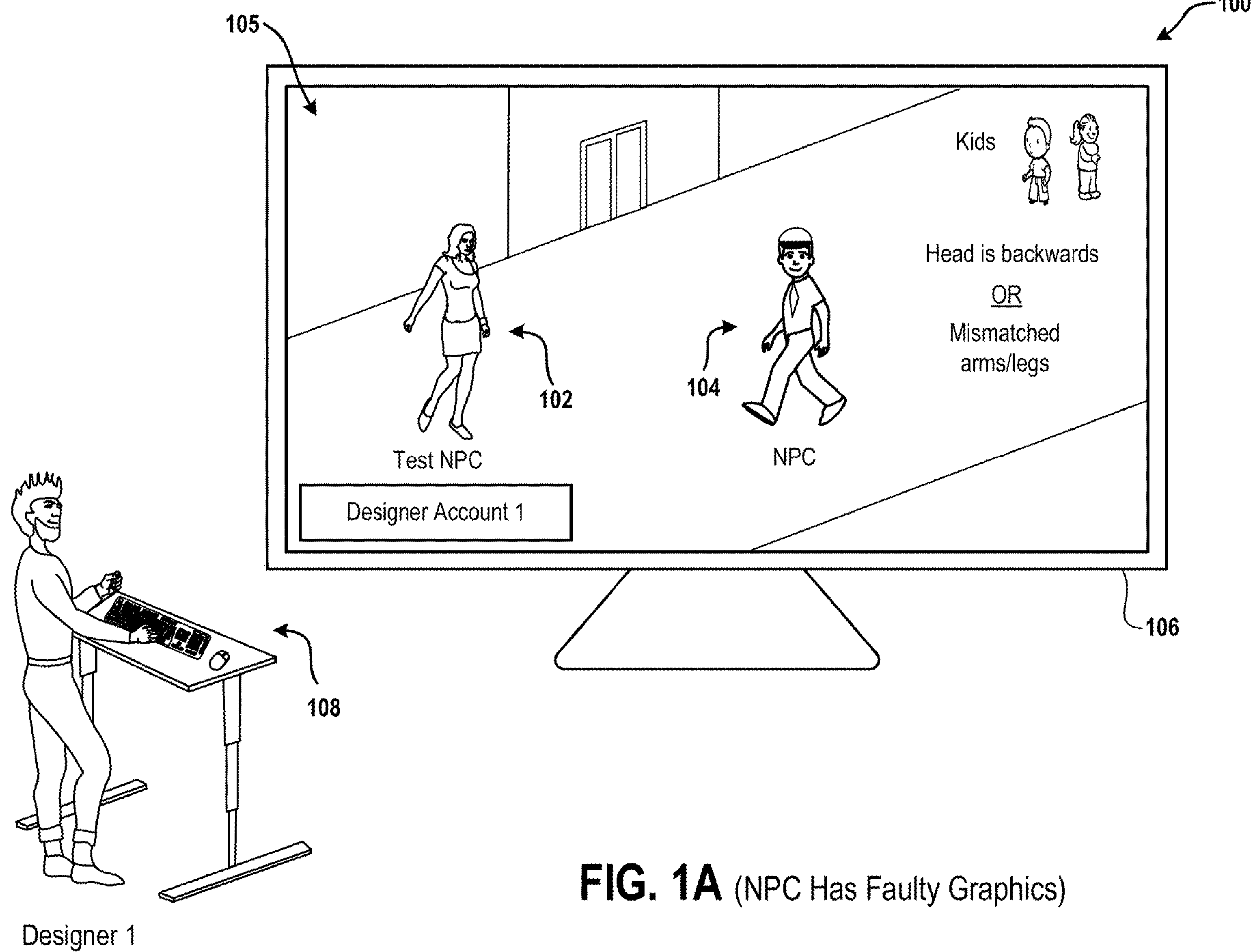
FIG. 1A (NPC Has Faulty Graphics)

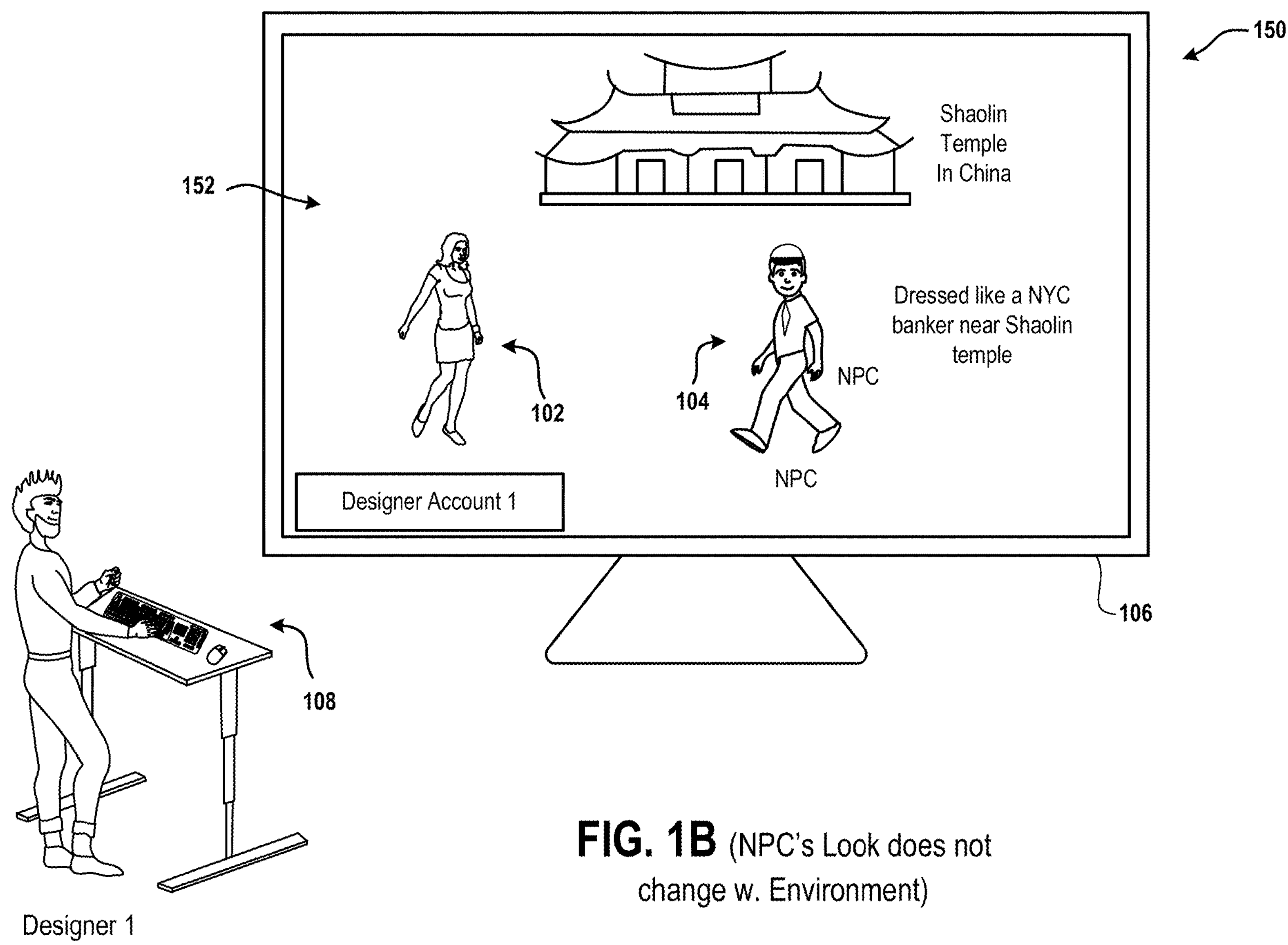
FIG. 1B (NPC's Look does not change w. Environment)

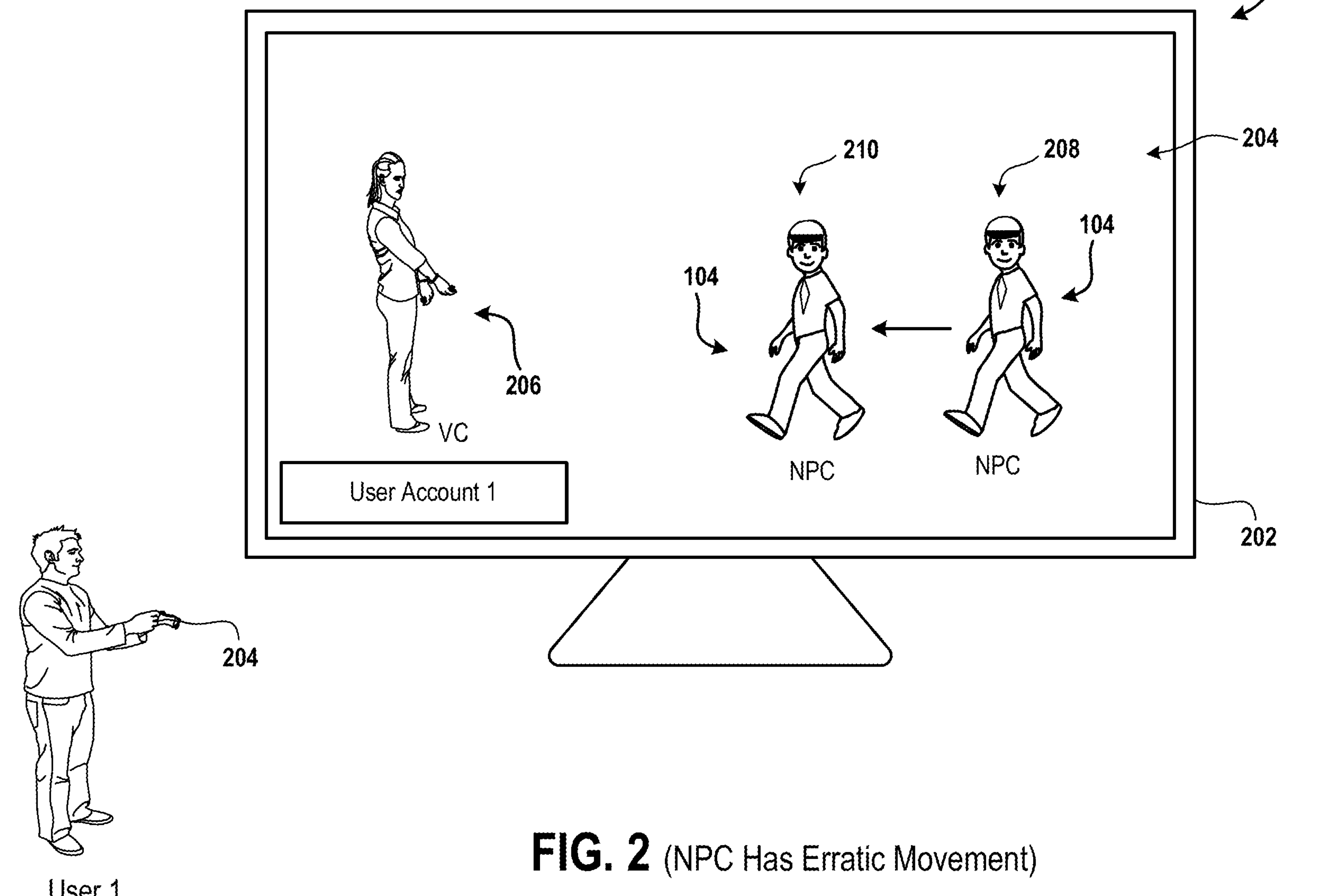
FIG. 2 (NPC Has Erratic Movement)

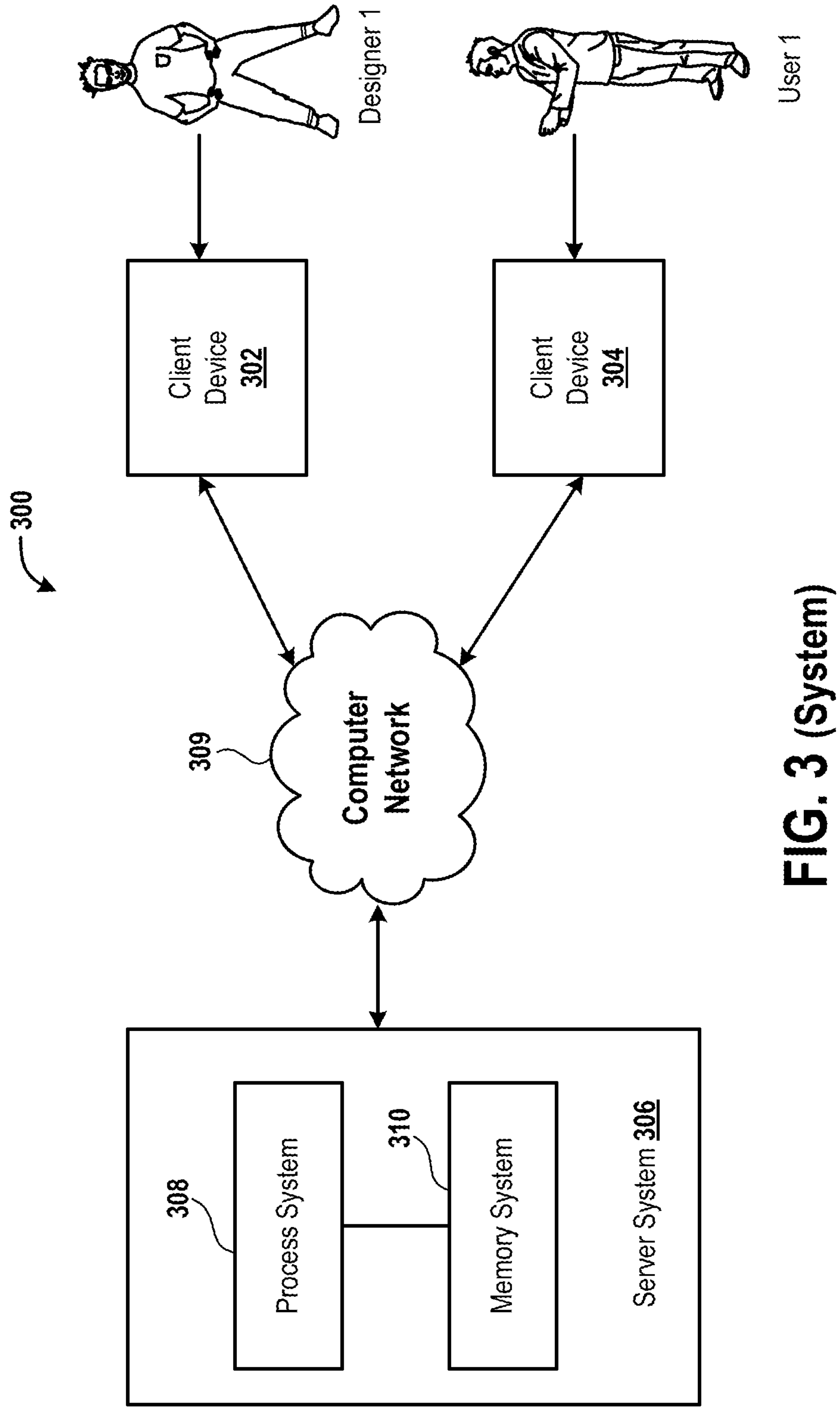
FIG. 3 (System)

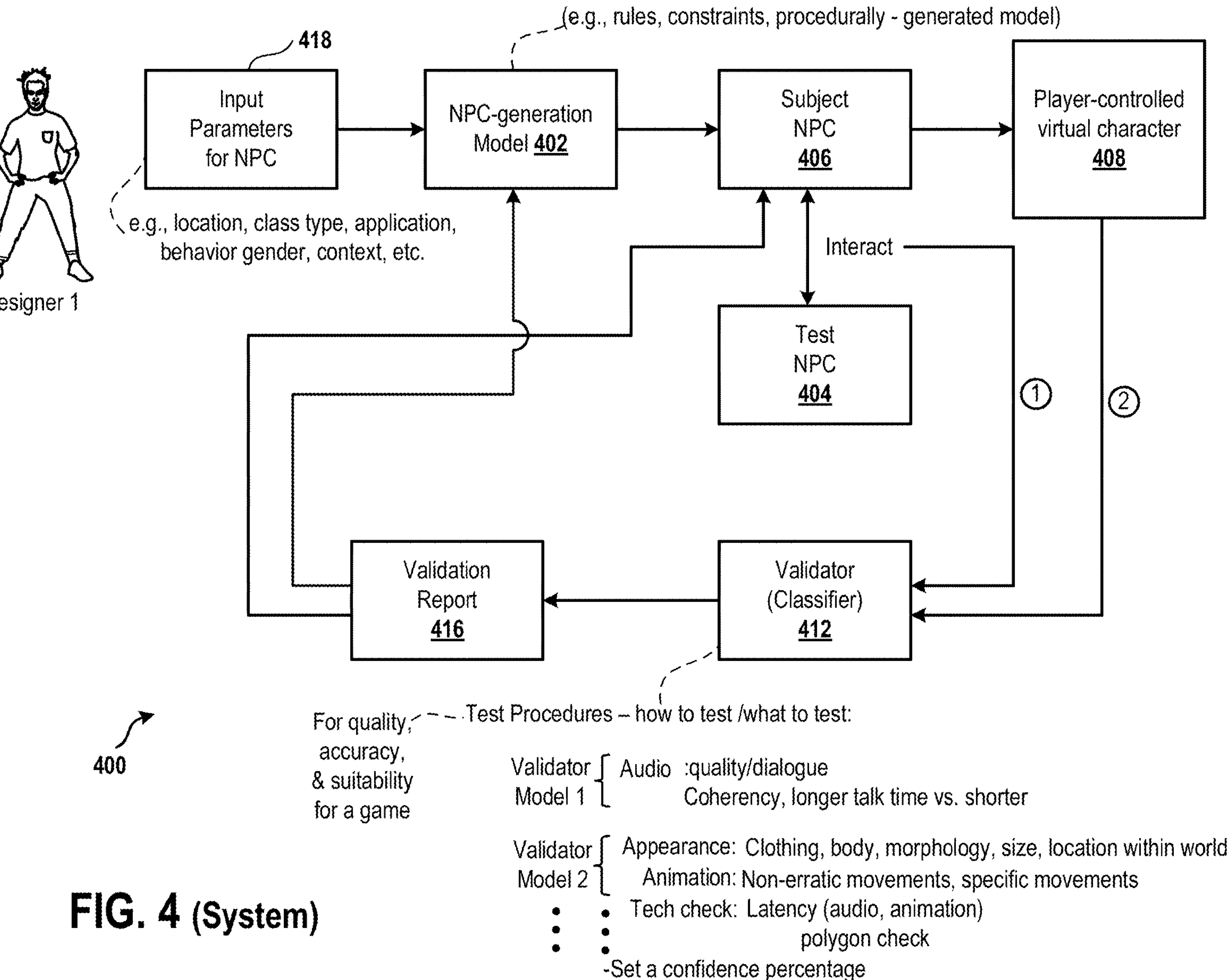
FIG. 4 (System)

SYSTEMS AND METHODS FOR TESTING AN NPC

FIELD

The present disclosure relates to systems and methods for testing a non-player character (NPC) are described.

BACKGROUND

A virtual world is a computer simulated environment. A virtual world of a video game may resemble the real world, with real world rules such as physical rules of gravity, geography, topography, and locomotion. The virtual world also incorporates rules for social and economic interactions between virtual characters. Players are represented as avatars, which include two or three-dimensional graphical representations.

Virtual worlds of a video game are used for massively multiple online role-playing games, for social or business networking, or for participation in imaginary social universes. In the virtual worlds, a player character or playable character (PC) is a virtual character that is controlled or controllable by a player. A non-player character (NPC) is a virtual character that is controlled by a computer program and not a player. For example, the NPC is controlled by an entity not under the direct control of the player. The NPC's behavior in the virtual worlds is scripted, triggered by certain actions or dialogue with the player character.

It is in this context that embodiments of the invention arise.

SUMMARY

Embodiments of the present disclosure describe systems and methods for testing a non-player character (NPC).

In an embodiment, a validation mechanism, such as an artificial intelligence (AI) model, is provided. As an example, the validation mechanism includes a set of procedures and tools for ensuring that the NPC meets certain criteria and standards for quality, accuracy, and suitability for a video game. To illustrate, the validation mechanism involves a combination of automated and manual processes, as well as various checks and tests. As another example, the validation mechanism is a quality control tool or process for testing the NPC's quality to identify issues like latency, errors, or other defects that affects a player's experience during a play of the video game. As yet another example, the validation mechanism includes rules and constraints that generate features and behavior of the NPC. The AI model is refined and improved over time to produce better NPCs.

To implement the validation mechanism, designers provide input parameters that populate inputs to the AI model. Examples of the input parameters include rules and constraints that govern appearance, movement, audio output, behavior, and interactions of a subject NPC with a virtual character controlled by a player and with other game elements. The designers specify and refine the input parameters over time to achieve better results. Based on the input parameters, the subject NPC is generated by the AI model.

The validation mechanism provides a quality control test for the subject NPC. For example, a test NPC interacts with the subject NPC to test the subject NPC. To illustrate, the test NPC tests an audio output from the subject NPC to check whether the subject NPC is functioning. As another illustration, the subject NPC is tested by the test NPC to determine latency issues with the subject NPC, and to determine whether the subject NPC has a quality, such as audio quality and movement quality, to work within a target space. Based on results of the tests, the validation mechanism refines and improves functionality of the subject NPC to produce better NPCs.

In one embodiment, different validator AI models for different aspects of validation are provided. For example, audio quality of the subject NPC is tested using a first AI model, movement of the subject NPC is tested using a second AI model, and so on. This helps identify more specific issues with the subject NPC and improves the overall quality of the subject NPC.

In an embodiment, a method for testing an NPC for use in a video game is described. The method includes generating parameters that define characteristics of the NPC. The characteristics include data that define visual features for the NPC, physical features for the NPC, and context features for a test video game for the NPC. The method further includes providing the parameters to an AI model trained for generating characters for use in games. The AI model outputs an interactive version of the NPC. The interactive version of the NPC includes interaction logic that defines a behavior mechanics for the NPC when activated. The method includes activating the interactive version of the NPC in the test video game and introducing a quality assurance NPC into the test video game. The quality assurance NPC is programmed to interact with the interactive version of the NPC in the test video game and generate test metrics regarding the interaction. The method includes modifying the interactive version of the NPC responsive to the test metrics.

In one embodiment, a server system for testing an NPC for use in a video game is described. The server system includes a processor. The processor generates parameters that define the characteristics of the NPC for a test video game for the NPC. The processor provides the parameters to the AI model, which outputs the interactive version of the NPC. The processor activates the interactive version of the NPC in the test video game and introduces a quality assurance NPC into the test video game. The quality assurance NPC is programmed to interact with the interactive version of the NPC in the test video game and generate test metrics regarding the interaction. The processor modifies the interactive version of the NPC responsive to the test metrics. The server system includes a memory device coupled to the processor.

Some advantages of the herein described methods and systems, described herein, include modifying a quality of the subject NPC or the AI model or a combination thereof. By testing the subject NPC to generate test metrics indicating faults in the subject NPC, the quality of the subject NPC or the AI model is increased.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1A is a diagram of an embodiment of a system to illustrate an interaction of a test non player character (NPC) with a subject NPC within a context.

FIG. 1B is a diagram of an embodiment of a system to illustrate that the subject NPC is incompatible with a context.

FIG. 2 is a diagram of an embodiment of a system to illustrate erratic movement of the subject NPC from one position to another.

FIG. 3 is a diagram of an embodiment of a system to illustrate communication between multiple client devices and a server system.

FIG. 4 is a diagram of an embodiment of a system to illustrate a modification of an NPC-generation model and the subject NPC based on interaction between a test NPC and the subject NPC.

DETAILED DESCRIPTION

Figure 5:
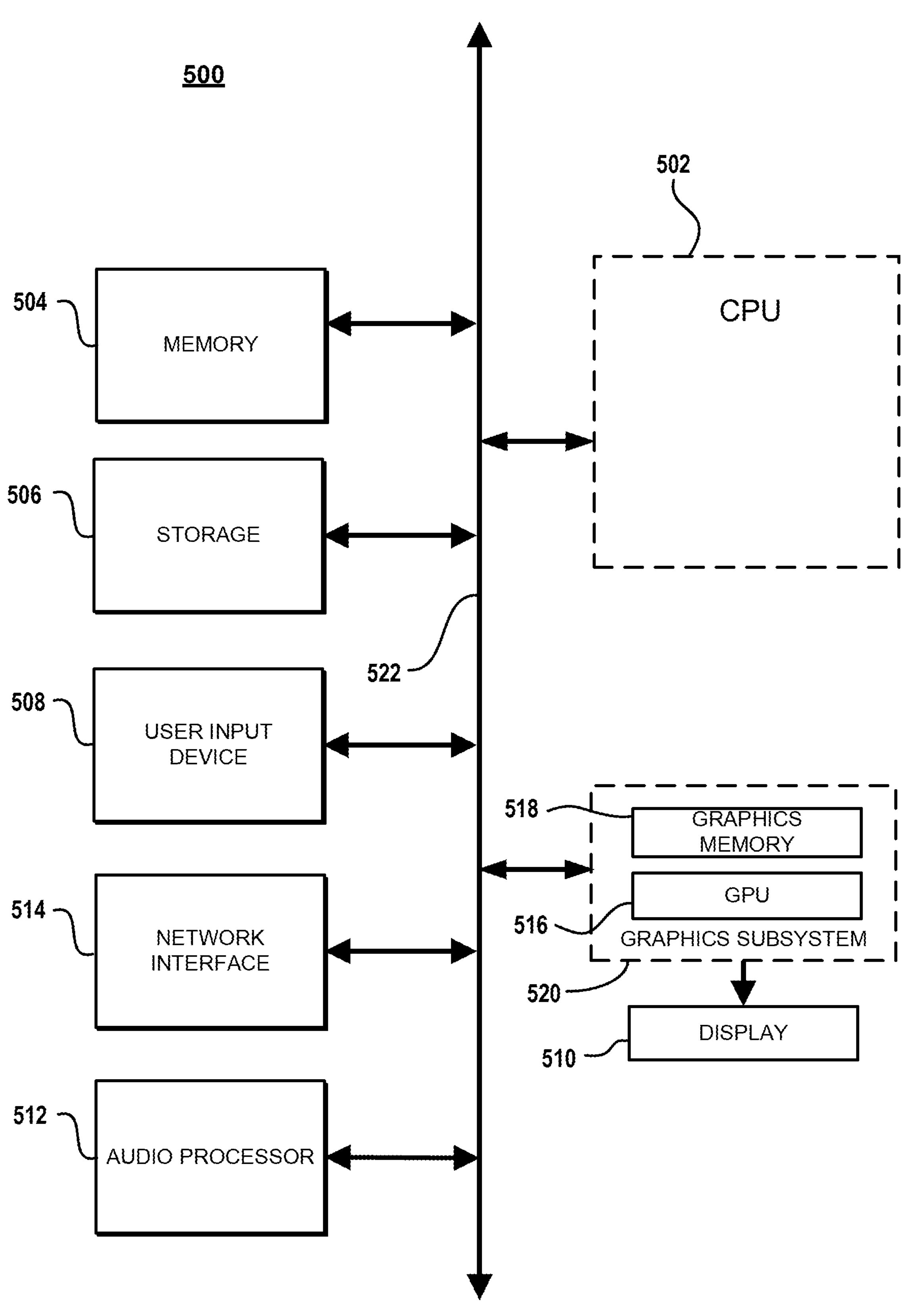
FIG. 5 illustrates components of an example device, such as a client device or a server system, described herein, that can be used to perform aspects of the various embodiments of the present disclosure.

Systems and methods for testing a non-player character (NPC) are described. It should be noted that various embodiments of the present disclosure are practiced without some or all of these specific details. In other instances, well known process operations have not been described in detail in order not to unnecessarily obscure various embodiments of the present disclosure.

FIG. 1A is a diagram of an embodiment of a system 100 to illustrate an interaction of a test non player character (NPC) 102 with a subject NPC 104 within a context 105. The system 100 includes a display device 106 and an input device system 108. Examples of a display device, as used herein, include a smart television, a television, a computer display, and a tablet. Examples of an input device system, as used herein, include a combination of a keyboard and a mouse, a hand-held controller, a stylus, a headphone, a combination of a headphone and a microphone, the keyboard, and a combination thereof. A display device and an input device system are components of a client device. An example of the context 105 includes a virtual environment of a location, such as a city or a village or town or a temple. To illustrate, the context 105 includes a virtual reality scene of New York city.

A designer 1 operates the input device system 108 to access a designer account 1 from a server system. Upon accessing the designer account 1, the designer 1 operates the input device system 108 to access a test video game from the server system. When the test video game is accessed, the server system executes a test game program stored within the server system. Upon execution of the test game program, the server system generates data for displaying identifiers, such as thumbnail data, of multiple contexts, such as multiple environments or multiple backgrounds, of the test video game, and sends the data via a computer network to the client device operated by the designer 1. Also, the server system executes the test game program to generate data for displaying multiple identifiers, such as thumbnail data, of multiple subject NPCs to be tested and data for displaying multiple identifiers, such as thumbnail data, of test NPCs to test the subject NPCs. A test NPC is sometimes referred to herein as a quality assurance NPC. The server system sends the data for displaying the identifiers of the subject NPCs and the test NPCs via the computer network to the client device operated by the designer 1.

Upon receiving the data for displaying the identifiers of the contexts, the test NPCs, and the subject NPCs from the server system, a graphical processing unit (GPU) of the client device displays the identifiers. The designer 1 operates the input device system 108 to select one of the identifiers of the contexts, one of the identifiers of one of the subject NPCs, such as the subject NPC 104, and one of the identifiers of one of the test NPCs, such as the test NPC 102. An indication of the selection of the identifiers of the context 105, the subject NPC 104, and the test NPC 102 is sent from the client device via the computer network to the server system.

When an indication of the selection is received, the server system sends data for displaying the context 105, the test NPC 102, and the subject NPC 104 via the computer network to the client device. In response to receiving the data for displaying the context 105, the test NPC 102, and the subject NPC 104, the GPU displays the context 105, the test NPC 102, and the subject NPC 104 on the display device 106.

The designer 1 operates the input device system 108 to activate the test NPC 102 to enable interaction of the test NPC 102 with the subject NPC 104. For example, the designer 1 operates the input device system 108 to control movement of the test NPC 102 and speaks into the microphone to enable the test NPC 102 to query the subject NPC 104. When the microphone is used, audio data is generated by the microphone and sent from the client device via the computer network to the server system. Upon receiving the audio data, the test game program is executed by the server system to interpret the audio data of the query and determine a response to the query. The server system generates response data indicating the response to the query and sends the response data via the computer network to the client device. The response data includes graphical data indicating graphics of the subject NPC 104, movement data indicating positions and orientations of the subject NPC 104, and audio data to be output as words from the subject NPC 104. Examples of the graphics include a look of the subject NPC 104, whether the subject NPC 104 has a first appearance or a second appearance, and clothes worn by the subject NPC 104. The first appearance is different from the second appearance in that at least one graphical feature of the first appearance is different from at least one graphical feature of the second appearance. Examples of graphical features include color, texture, shape, size, intensity, and number of polygons, etc. Examples of the movement data include whether the subject NPC 104 is walking or running or moving towards the test NPC 102 to listen closely to the query from the test NPC 102 or moving away from the test NPC 102 in response to the query or is jumping or stretching or doing yoga in response to the query.

Upon receiving the response data, the GPU of the client device controls the subject NPC 104 to look or appear on the display device 106 according to the graphical data and to move according to the movement data, and an audio processor of the client device controls the subject NPC 104 to output the audio data as voice, which is the response to the query. For example, the subject NPC 104 has a faulty look or a faulty voice or faulty movement or a combination thereof. To illustrate, the subject NPC 104 has a first look and the voice of the subject NPC 104 is illustrative of a second look and vice versa. The second look is different from the first look in that at least one graphical feature of the second look is different from at least one graphical feature of the first look. As another illustration, the subject NPC 104 is displayed as having faulty graphics. To illustrate, when the subject NPC 104 outputs the voice, the head of the subject NPC 104 looks backwards to look away from the test NPC 102 or a finger of the subject NPC 104 is missing or a hand of the subject NPC 104 has six fingers or the fingers are of a faulty shape, such as a zigzag shape.

In one embodiment, instead of the designer 1 operating the input device system 108, a user, such as a player, controls a virtual character, via the hand-held controller to interact with the subject NPC 104. For example, the user uses the hand-held controller to log into a user account. The user account is assigned to the user by the server system. Upon logging into the user account, the user operates the hand-held controller to access a video game. The video game has similar functionality, such as the same functionality, as that of the test video game. To illustrate, faults in the test video game are reduced, such as fixed, by the server system or by the designer 1 to output the video game. When the video game is accessed, a game program of the video game is executed by the server system to generate the data for displaying the context 105, the virtual character, and the subject NPC 104. The virtual character is similar to the test NPC 102 except that the virtual character is controlled by the user instead of by the test game program. For example, the virtual character has the same functionality and the same look as that of the test NPC 102. The user operates the hand-held controller to control the virtual character to interact with the subject NPC 104. For example, the user operates the hand-held controller to control the virtual character to query the subject NPC 104.

FIG. 1B is a diagram of an embodiment of a system 150 to illustrate that the subject NPC 104 is incompatible with a context 152. The system 150 includes the display device 106 and the input device system 108. An example of the context 152 is a virtual scene that represents Shaolin temple in China. The context 152 is generated and displayed in a manner that is similar to the generation of the context 105. For example, instead of selecting the identifier of the context 105 (FIG. 1A), the designer 1 selects an identifier of the context 152. The identifier of the context 152 is one of the identifiers of the contexts described above with reference to FIG. 1A. Upon receiving the identifier of the context 152, the server system executes the test game program to generate data for displaying the context 152 and sends the data via the computer network to the client device operated by the designer 1. Upon receiving the data, the GPU of the client device displays the context 152 on the display device 106. Also, the test NPC 102 and the subject NPC 104 are generated and displayed in the same manner as that described above with reference to FIG. 1A except the test NPC 102 and the subject NPC 104 are displayed within the context 152.

The context 152 or the graphics of the subject NPC 104 is faulty when the context 152 is incompatible with, such as does not align with, the graphics of the subject NPC 104. For example, the subject NPC 104 is wearing a tie although the subject NPC 104 is near a location of the Shaolin temple. When the test game program is executed to generate data for displaying the subject NPC 104 within the context 150 instead of the context 105, the same graphics data used to displaying the subject NPC 104 within the context 105 is generated by the server system and sent via the computer network device to the client device operated by the designer 1. Upon receiving the graphics data, the GPU of the display device 106 displays the subject NPC 104 in the context 152. The graphics of the subject NPC 104 does not align with the context 152. Comparatively, the graphics of the subject NPC 104 is compatible with the context 105.

FIG. 2 is a diagram of an embodiment of a system 200 to illustrate erratic movement of the subject NPC 104 from one position to another. The system 200 includes a display device 202 and a hand-held controller 204. A user 1 logs into a user account 1 assigned to the user 1 by the server system. The user 1 logs into the user account 1 to access the video game from the server system. For example, after logging into the user account 1, the user 1 operates the hand-held controller 204 to select a game title of the video game. An indication of the selection is sent from a client device operated by the user 1 via the computer network to the server system. An example of the client device operated by the user 1 includes a combination of the hand-held controller 204 and the display device 202. Upon receiving indication of the selection of the game title, the game program of the video game is executed by the server system to generate virtual scene data. The server system sends the virtual scene data via the computer network to the client device operated by the user 1.

Upon receiving the virtual scene data, a GPU of the display device 202 displays a virtual scene 204. The virtual scene 204 includes a virtual character (VC) 206 that is controlled by the user 1 via the hand-held controller 204 and further includes the subject NPC 104. The user 1 operates the hand-held controller 204 to control the virtual character 206 to interact with, such as query, the subject NPC 104. Data indicating the operation of the hand-held controller 204 is sent from the client device operated by the user 1 via the computer network to the server system.

Upon receiving the data indicating the operation of the hand-held controller 204, the server system executes the game program to determine movement of the subject NPC 104 based on the operation to generate movement data. The server system sends the movement data via the computer network to the client device operated by the user 1. In response to receiving the movement data, the GPU of the client device operated by the user 1 displays an erratic movement of the subject NPC 104 from a position 208 to a position 210. The movement is erratic because there is a lack of smooth transition from the position 208 to the position 210. A display of multiple positions between the positions 208 and 210 is skipped.

FIG. 3 is a diagram of an embodiment of a system 300 to illustrate communication between client devices 302 and 304 and a server system 306. The system 300 includes the server system 306, a computer network 309, and the client devices 302 and 304. The server system 306 includes a processor system 308 and a memory system 310. Examples of the processor system include one or more processors that are coupled to each other. As used herein, a processor refers to a central processing unit (CPU), a GPU, a combination of the CPU and the GPU, an application specific integrated circuit (ASIC), a programmable logic device (PLD), or a microcontroller, and these words are used herein interchangeably. Examples of the memory system 310 include one or more memory devices that are coupled to each other. The processor system 308 is coupled to the memory system 310.

The processor system 308 is coupled via the computer network 309 to the client devices 302 and 304. The client device 302 is an example of the client device operated by the designer 1 and the client device 304 is an example of the client device operated by the user 1.

FIG. 4 is a diagram of an embodiment of a system 400 to illustrate a modification of an NPC-generation model 402 based on interaction between a test NPC 404 and a subject NPC 406. As an example, the subject NPC 406 is a version of an NPC that interacts with one or more other NPCs, such as the test NPC 102 (FIG. 1A). As such, the subject NPC 406 is sometimes referred to herein as an interactive version of an NPC. The system 400 includes the NPC generation model 402, the test NPC 404, the subject NPC 406, a player-controlled virtual character 408, a validator 412, a validation report 416, and input parameters 418 for generating the subject NPC 406.

A model, as described herein, includes an artificial intelligence (AI) model or a computer program or a combination thereof. For example, the model is simulation of human intelligence processes by the processor system 308 (FIG. 3). To illustrate, the NPC generation model 402 is a portion of the test game program. As another illustration, the NPC generation model 402 is an AI model that is accessed by the test game program for generation and operation, such as movement and sound output, of the NPCs 404 and 406. Examples of the sound output include one or more queries from the test NPC 404 and one or more responses to the one or more queries by the subject NPC 406. As another illustration, the NPC generation model 402 is a portion of the game program. The model is executed by the processor system 308 and is stored in the memory system 310.

An example of the test NPC 404 is the test NPC 102 (FIG. 1A) and an example of the subject NPC 406 is the subject NPC 104 (FIG. 1A). An example of the player controlled virtual character 408 is the virtual character 206 (FIG. 2). An example of the validator 412 is an AI model or a computer program or a combination thereof.

As an example, the input parameters 418 define characteristics of the subject NPC 406. Examples of the characteristics include data that define visual features of the NPC 406, physical features for the subject NPC 406, and one or more contexts, such as context features, of the test video game in which the NPC 406 is to be placed. As an illustration, the visual features include an appearance, such as a look, shape, size, type of clothing, shape of the clothing, and color of the clothing, of the subject NPC 406. The appearance of the subject NPC 406 is sometimes referred to herein as graphics of the subject NPC 406. Whether the clothing is a shirt or a t-shirt, a pant or a short, a saree or a gown are illustrations of the type of clothing. An example of the look of the subject NPC 406 includes facial features, body features, texture, and color to be assigned to the subject NPC 406. To illustrate, the body features include a number of fingers of the subject NPC 406 and a number of arms of the NPC 406. The facial features and the body features define a gender of the subject NPC 406, and the gender provides the look of the subject NPC 406. As an illustration, the physical features of the subject NPC 406 include a behavior of the subject NPC 406, such as a manner in which the subject NPC 406 responds to the query from the test NPC 404 or an amount of time taken to reply to the query or a combination thereof. To further illustrate, the physical features include whether the subject NPC 406 runs or walks towards the test NPC 404 in response to the query from the test NPC 404, words output from the NPC 404 in response to the query, and a tone, such as angry or polite, in which the words are output. The behavior of the subject NPC 406 is sometimes referred to herein as behavior mechanics or behavior functionality and is an example of logic of interaction between the test NPC 404 and the subject NPC 406. Examples of the one or more contexts include one or more virtual environments, including one or more virtual backgrounds, in which the subject NPC 406 is to be placed. To illustrate, the contexts include the context 105 (FIG. 1A), the context 152 (FIG. 1B), and the context 204 (FIG. 2). To illustrate further, the input parameters 418 include the one or more contexts in which the subject NPC 406 is to be located and moved, the appearance of the subject NPC 406, the behavior, such as functionality, of the subject NPC 406, and a class type of the subject NPC 406. Examples of the class type include alchemist, bandit, mage, and worshipper.

The designer 1 operates the client device 302 (FIG. 3) to provide the input parameters 418 for generating the subject NPC 406. In response to receiving the input parameters 418, the processor system 308 executes the NPC generation model 402 to generate data for displaying and controlling the subject NPC 406 within the context, such as the context 105 or 152 (FIGS. 1A and 1B). For example, in response to receiving the visual features of NPC 104, the physical features of the NPC 104, and the one or more contexts in which the NPC 104 is to be placed, the NPC-generation model 402 determines a probability that the input parameters 418 match a pre-determined number, such as a majority, of input parameters from input parameters, of multiple subject NPCs, received from multiple designers. The input parameters of the subject NPCs and the subject NPCs are received from the designers by the NPC-generation model 402. The pre-determined number of input parameters provides the visual features and the physical features of the subject NPC 406, and the one or more contexts in which the subject NPC 406 is placed and operated. Upon determining that the probability that the input parameters 418 match the pre-determined number of input parameters received from multiple designers, the NPC-generation model 402 determines that the input parameters 418 define the subject NPC 406, and outputs the subject NPC 406 with a high probability, such as one greater than 50%.

The test NPC 404 is generated by the processor system 308 to be displayed within a context, such as the context 105 or 152. For example, the processor system 308 executes the NPC-generation model 402 to generate the test NPC 404 according to input parameters received from the designer 1 via the client device 302. To illustrate, the input parameters for generating the test NPC 404 are the same as the input parameters 418 for generating the subject NPC 406 except that one or more of the input parameters for generating the test NPC 404 is different from one or more of the input parameters 418. For example, the input parameters for generating the test NPC 102 indicate that the test NPC 404 has long hair and the input parameters 418 indicate that the subject NPC 104 has short hair and is wearing a tie and a cap. As another example, input parameters for generating the test NPC 404 indicate that the test NPC 404 has the first look and the input parameters 418 indicate that the subject NPC 104 has the second look. As yet another example, the input parameters for generating the test NPC 404 indicate that the test NPC 404 will initiate the query and the input parameters 418 generating the subject NPC 406 indicate that the subject NPC 406 will respond to the query. The query is initiated as soon as the test NPC 404 is placed in a context, such as the context 105 (FIG. 1A) or the context 152 (FIG. 1B). Also, the input parameters 418 indicate a response to the query, such as words or sentences for replying to the query. Based on the input parameters for generating the test NPC 404, the NPC-generation model 402 generates the test NPC 404 in the same manner in which the subject NPC 406 is generated from the input parameters 418.

In a similar manner in which the test NPC 404 is generated based on the input parameters for generating the test NPC 404 and the subject NPC 406 is generated based on the input parameters 418, other test NPCs and other subject NPCs are generated by the NPC-generation model 402 based on several input parameters. The test NPC 404 and the other test NPCs together are the test NPCs described above with respect to FIG. 1A. Similarly, the subject NPC 406 and the other subject NPCs together are the subject NPCs described above with respect to FIG. 1A.

Upon generating the test NPC 404 and the subject NPC 406, the processor system 308 executes the test game program to generate and provide the data for displaying the identifiers of the test and subject NPCs and the contexts, such as the test NPC 404 and the subject NPC 406 and the context 150 or 152, via the computer network 309 to the client device 302 (FIG. 3) operated by the designer 1. In response to providing the data for displaying the identifiers of the test and subject NPCs and the contexts, the processor system 308 receives the indication of the selection of one of the test NPCs, such as the test NPC 404, the selection of one of the subject NPCs, such as the subject NPC 406, and the selection of one of the contexts, such as the context 150 or 152, via the computer network 309 from the client device operated by the designer 1. Upon receiving the indication of the selection of the one of the test NPCs, such as the test NPC 404, the selection of one of the subject NPCs, such as the subject NPC 406, and the selection of one of the contexts, such as the context 150 or 152, via the computer network 309 from the client device operated by the designer 1, the processor system 308 generates the data for displaying the context 105 or 152, the test NPC 404, and the subject NPC 406 and sends the data via the computer network 309 to the client device 302 (FIG. 3). The data for displaying the context 105 or 152, the test NPC 404, and the subject NPC 406 is generated and sent to the client device 302 for activating, such as placing, the subject NPC 406 in the one of the contexts of the test video game. During the activation of the subject NPC 406, the test NPC 404 and the subject NPC 406 interact with each other in the one of the contexts of the test video game. For example, the processor system 308 controls the test NPC 404 to initiate the interaction with the subject NPC 406, such as query the subject NPC 406.

Moreover, upon receiving an indication of the initiation of the interaction between the test NPC 404 and the subject NPC 406 from the client device 302 via the computer network 309, the validator 412 analyzes the interaction within the test video game to generate the validation report 416 that includes results, such as test metrics, of the interaction. For example, the validator 412, which is sometimes referred to herein as a classifier, includes test procedures and tools for determining quality, accuracy, and suitability of the subject NPC 406 for use in the video game. To illustrate, the validator 412 includes tools that define how to test interaction between the test NPC 404 and the subject NPC 406 and what functions, such as interaction logic, of the interaction are to be tested. To further illustrate, the validator 412 includes an audio validator model that examines a quality of interaction, such as interaction logic, of audio data that is exchanged between the test NPC 404 and the subject NPC 406. Examples of the quality of interaction include coherency of the interaction of audio data and an amount of time of the interaction, content of the audio data, and quality of the audio data. In the further illustration, the audio validator model determines whether the response provided by the subject NPC 406 to the query received from the test NPC 404 are sentences that satisfy pre-learned grammatical rules, such as, whether the response includes words that are in a grammatical order. An example of the grammatical order is subject followed by a verb, which is followed by an object.

The pre-learned grammatical rules are learned by the audio validator model based on interactions between some of the other subject NPCs and some of the other test NPCs. The audio validator model receives audio data regarding interactions between the some of the other subject NPCs and the some of the other test NPCs from client devices operated by the designers. The audio data is received with indications from the client devices operated by the designers that the interactions between the some of the other subject NPCs and the some of the other test NPCs satisfy grammatical rules. The grammatical rules are received from the client devices operated by the designers. Upon receiving the indications, the audio validator model determines the grammatical rules to be the pre-learned grammatical rules. Also, the audio validator model receives audio data regarding interactions between the remaining ones of the other subject NPCs and the remaining ones of the other test NPCs from the client devices operated by the designers. The audio data is received with indications from the client devices operated by the designers that the interactions between the remaining ones of the other subject NPCs and the remaining ones of the other test NPCs does not satisfy the grammatical rules.

Moreover, in the further illustration, the audio validator model determines whether the amount of time of interaction of audio data is greater than a pre-learned amount of time. Upon determining that the response includes sentences that satisfy the pre-learned grammatical rules and the amount of time of interaction is greater than the pre-learned amount of time, the audio validator model determines that the interaction of audio data between the NPCs 404 and 406 is of good quality to disfavor modification of the subject NPC 406. On the other hand, upon determining that the response includes sentences that do not satisfy the pre-learned grammatical rules or determining that the amount of time of interaction is less than the pre-learned amount of time, the audio validator model determines that the interaction of audio data between the NPCs 404 and 406 is of bad quality, such as faulty, to favor modification of the subject NPC 406. Each of the good quality and bad quality of interaction of audio data between the NPCs 404 and 406 is an example of the test metrics, such as the results of the interaction of audio data between the NPCs 404 and 406.

In the further illustration, the pre-learned amount of time is learned by the audio validator model based on interactions between some of the other subject NPCs and some of the other test NPCs. The audio validator model receives audio data regarding interactions between the some of the other subject NPCs and the some of the other test NPCs from the client devices operated by the designers. The audio data is received with indications from the client devices operated by the designers that the interactions between the some of the other subject NPCs and the some of the other test NPCs is greater than an amount of time. The amount of time is received from the client devices operated by the designers. Upon receiving the indications, the audio validator model identifies the amount of time to be the pre-learned amount of time. Also, the audio validator model receives audio data regarding interactions between the remaining ones of the other subject NPCs and the remaining ones of the other test NPCs from the client devices operated by the designers. The audio data is received with indications from the client devices operated by the designers that the interactions between the remaining ones of the other subject NPCs and the remaining ones of the other test NPCs is less than the amount of time.

As another further illustration, the validator 412 includes an appearance validator model that examines graphics of the subject NPC 406 and compatibility of the subject NPC 406 with a context, such as the context 105 or 152, in which the subject NPC 406 is placed. To illustrate, the appearance validator model determines whether the subject NPC 406 has proper clothing or lacks proper clothing, whether a morphology of the subject NPC 406 satisfies a pre-learned morphology, or whether a size of the subject NPC 406 matches a pre-learned size, or a combination thereof. When the subject NPC 406 is compatible with the context in which the subject NPC 406 is placed, the subject NPC 406 has proper clothing and when the subject NPC 406 is incompatible with the context in which the subject NPC 406 is placed, the subject NPC 406 lacks proper clothing. Upon determining that the subject NPC 406 has proper clothing, the morphology satisfies the pre-learned morphology, and the size of the subject NPC 406 matches the pre-learned size, the appearance validator model determines that the subject NPC 406 has a good appearance to disfavor modification of the subject NPC 406. On the other hand, upon determining that the subject NPC 406 lacks proper clothing, or the morphology does not satisfy the pre-learned morphology, or the size of the subject NPC 406 does not match the predetermined size, or a combination thereof, the appearance validator model determines that the subject NPC 406 has a bad appearance to favor modification of the subject NPC 406. The bad appearance is sometimes referred to herein as faulty graphics in the subject NPC 406. Each of the good appearance and the bad appearance is an example of the test metrics.

In the further illustration, the inclusion of the proper clothing or lack of the proper clothing is learned by the appearance validator model based on some of the other subject NPCs. The appearance validator model receives data identifying appearances of the some of the other subject NPCs from client devices operated by the designers. The data identifying appearances of the some of the other subject NPCs is received with indications from the client devices operated by the designers that the appearances include the proper clothing. Also, the appearance validator model receives data identifying appearances of the remaining ones of the other subject NPCs from the client devices operated by the designers. The data identifying appearances of the remaining ones of the other subject NPCs is received with indications from the client devices operated by the designers that the appearances lack the proper clothing.

The appearance validator model compares an appearance of the subject NPC 406 within the context, such as the context 105 or 152, with the data identifying appearances of the some of the other subject NPCs within the context and the data identifying appearances of the remaining ones of the other subject NPCs within the context to determine whether the appearance of the subject NPC is similar to the appearances of the some of the other subject NPCs or to the appearances of the remaining ones of the other subject NPCs. For example, the appearance validator model determines that a shape of type of clothing of the subject NPC 406 within the context is within a predetermined range from shapes of types of clothing of the some of the other subject NPCs within the context and outside the predetermined range from shapes of types of clothing of the remaining ones of the other subject NPCs within the context to determine that the appearance of the subject NPC 406 is similar to that of the some of the other subject NPCs. On the other hand, the appearance validator model determines that the shape of the type of clothing of the subject NPC 406 within the context is within the predetermined range from the shapes of types of clothing of the remaining ones of the other subject NPCs within the context and outside the predetermined range from the shapes of types of clothing of the some of the other subject NPCs within the context to determine that the appearance of the subject NPC 406 is similar to that of the remaining ones of the other subject NPCs. Upon determining that the appearance of the subject NPC 406 within the context is similar to that of the some of the other subject NPCs within the context, the appearance validator model determines that the appearance of the subject NPC 406 has the proper clothing to further determine that the proper clothing is compatible with the context in which the subject NPC 406 is placed. On the other hand, in response to determining that the appearance of the subject NPC 406 within the context is similar to that of the remaining ones of the other subject NPCs within the context, the appearance validator model determines that the subject NPC 406 lacks the proper clothing to further determine that the lack of the proper clothing is incompatible with the context in which the subject NPC 406 is placed.

As yet another further illustration, the validator 412 includes an animation model that analyzes movements of the subject NPC 406 during interaction with the test NPC 404. The animation model determines whether a movement of the subject NPC 406 in response to the query from the test NPC 404 is erratic or non-erratic, such as smooth. The movement is determined to be erratic or non-erratic based on pre-learned movements of the other subject NPCs during interactions with the other test NPCs. Each of the erratic and non-erratic movement of the subject NPC 406 is an example of the test metrics. The erratic movement of the subject NPC 406 is sometimes referred to herein as faulty movement.

In the further illustration, whether the movement of the subject NPC 406 is erratic or non-erratic is learned by the animation model based on movements of the some of the other subject NPCs and movements of the remaining ones of the other subject NPCs. The animation model receives data identifying movements of the some of the other subject NPCs. The data identifying movements of the some of the other subject NPCs is received with indications from the client devices operated by the designers that the movements are non-erratic. Also, the animation model receives data identifying movements of remaining ones of the other subject NPCs from the client devices operated by the designers. The data identifying movements of the remaining ones of the other subject NPCs is received with indications from the client devices operated by the designers that the movements are erratic.

The animation model compares the movement of the subject NPC 406 with the data identifying movements of the some of the other subject NPCs and the data identifying movements of the remaining ones of the other subject NPCs to determine whether the movement of the subject NPC 406 is similar to the movements of the some of the other subject NPCs or to the movements of the remaining ones of the other subject NPCs. For example, the animation model determines that the movement, such as a change in position or a change in an orientation or a combination thereof, of the subject NPC 406 is within a predetermined range from the movements of the some of the other subject NPCs and outside the predetermined range from the movements of the remaining ones of the other subject NPCs to determine that the movement of the subject NPC 406 is similar to that of the some of the other subject NPCs. On the other hand, the animation model determines that the movement of the subject NPC 406 is within the predetermined range from the movements of the remaining ones of the other subject NPCs and outside the predetermined range from the movements of the some of the other subject NPCs to determine that the movement of the subject NPC 406 is similar to that of the remaining ones of the other subject NPCs. Upon determining that the movement of the subject NPC 406 is similar to that of the some of the other subject NPCs, the animation model determines that the movement of the subject NPC 406 is non-erratic to disfavor modification of the subject NPC 406. On the other hand, in response to determining that the movement of the subject NPC 406 is similar to that of the remaining ones of the other subject NPCs, the animation model determines that the movement of the subject NPC 406 is erratic to favor modification of the subject NPC 406.

As another further illustration, the validator 412 includes a tech check model that examines latency of the movement of the subject NPC 406 while interacting with the test NPC 404 and latency of output of sound from the subject NPC 406 in response to the query from the test NPC 404. The tech check model compares the latency of movement of the subject NPC 406 with pre-learned latencies of movements of the other subject NPCs during interaction with the other test NPCs to determine whether the movement of the subject NPC 406 is latent or not.

In the further illustration, whether the movement of the subject NPC 406 is latent or not is learned by the tech check model based on movements of the some of the other subject NPCs and movements of the remaining ones of the other subject NPCs. The tech check model receives data identifying movements of the some of the other subject NPCs. The data identifying movements of the some of the other subject NPCs is received with indications from the client devices operated by the designers that the movements are not latent. Also, the tech check receives data identifying movements of remaining ones of the other subject NPCs from the client devices operated by the designers. The data identifying movements of the remaining ones of the other subject NPCs is received with indications from the client devices operated by the designers that the movements are latent.

The tech check model compares the movement of the subject NPC 406 with the data identifying movements of the some of the other subject NPCs and the data identifying movements of the remaining ones of the other subject NPCs to determine whether the movement of the subject NPC 406 is similar to the movements of the some of the other subject NPCs or to the movements of the remaining ones of the other subject NPCs. For example, the tech check model determines that the movement, such as a change in position or a change in an orientation or a combination thereof, of the subject NPC 406 is within a predetermined range from the movements of the some of the other subject NPCs and outside the predetermined range from the movements of the remaining ones of the other subject NPCs to determine that the movement of the subject NPC 406 is similar to that of the some of the other subject NPCs. On the other hand, the tech check model determines that the movement of the subject NPC 406 is within the predetermined range from the movements of the remaining ones of the other subject NPCs and outside the predetermined range from the movements of the some of the other subject NPCs to determine that the movement of the subject NPC 406 is similar to that of the remaining ones of the other subject NPCs. Upon determining that the movement of the subject NPC 406 is similar to that of the some of the other subject NPCs, the tech check model determines that the movement of the subject NPC 406 is not latent to disfavor modification of the subject NPC 406. On the other hand, in response to determining that the movement of the subject NPC 406 is similar to that of the remaining ones of the other subject NPCs, the tech check model determines that the movement of the subject NPC 406 is latent to favor modification of the subject NPC 406. The determination that the movement of the subject NPC 406 is latent or not is an example of the test metrics. The latent movement of the subject NPC 406 is sometimes referred to herein as faulty movement.

As another further illustration, the tech check model compares the latency of output of audio data from the subject NPC 406 in response to the query from the test NPC 404 with pre-learned latencies of output of audio data from the other subject NPCs during interaction with the other test NPCs to determine whether the output of the audio data from the subject NPC 406 is latent or not. In the further illustration, whether the output of audio data from the subject NPC 406 is latent or not is learned by the tech check model based on outputs of audio data from the some of the other subject NPCs and outputs of audio data from the remaining ones of the other subject NPCs. The tech check model receives audio data output from the some of the other subject NPCs. The audio data output from the some of the other subject NPCs is received with indications from the client devices operated by the designers that the audio data is output with no latency. Also, the tech check receives audio data output from the remaining ones of the other subject NPCs from the client devices operated by the designers. The audio data output from the remaining ones of the other subject NPCs is received with indications from the client devices operated by the designers that the audio data is output with latency.

The tech check model compares a rate of output of audio data from the subject NPC 406 during the interaction with the test NPC 404 with rates of the audio data output from the some of the other subject NPCs and rates of audio data output from the remaining ones of the other subject NPCs to determine whether the rate of output of the audio data from subject NPC 406 is similar to the rates of the output of audio data from the some of the other subject NPCs or to the rates of output of audio data from the remaining ones of the other subject NPCs. For example, the tech check model determines that the rate of output of audio data from the subject NPC 406 is within a predetermined range from the rates of output of audio data from the some of the other subject NPCs and outside the predetermined range from the rates of output of audio data from the remaining ones of the other subject NPCs to determine that the rate of output of audio data from the subject NPC 406 is similar to that of the some of the other subject NPCs. On the other hand, the tech check model determines that the rate of output of audio data from the subject NPC 406 is within the predetermined range from the rates of output of audio data from the remaining ones of the other subject NPCs and outside the predetermined range from the rates of output of audio data from the some of the other subject NPCs to determine that the rate of output of audio data from the subject NPC 406 is similar to that of the remaining ones of the other subject NPCs. Upon determining that the rate of output of audio data from the subject NPC 406 is similar to that of the some of the other subject NPCs, the tech check model determines that the audio data is output from the subject NPC 406 without latency to disfavor modification of the subject NPC 406. On the other hand, in response to determining that the rate of output of audio data from the subject NPC 406 is similar to that of the remaining ones of the other subject NPCs, the tech check model determines that the audio data is output from the subject NPC 406 with latency to favor modification of the subject NPC 406. The determination that the output of the audio data from the subject NPC 406 is latent or not is an example of the test metrics. The latent output of the audio data of the subject NPC 406 is sometimes referred to herein as faulty audio output.

Moreover, as yet another further illustration, the tech check model compares the graphics, such as a number of polygons, of the subject NPC 406 with pre-learned graphics to determine whether the subject NPC 406 satisfies a polygon check. Upon determining that the number of polygons of the subject NPC 406 is within a predetermined range from the pre-learned graphics, the tech check model determines the subject NPC 406 satisfies the polygon check. On the other hand, upon determining that the number of polygons of the subject NPC 406 is outside the predetermined range from the pre-learned graphics, the tech check model determines that the subject NPC 406 fails the polygon check. The determination that the subject NPC 406 passes or fails the polygon check is an example of the test metrics.

The pre-learned graphics are learned by the tech check model based on the other subject NPCs. The tech check model receives graphics data, such as a number of polygons, of the some of the other subject NPCs and graphics data, such as a number of polygons, from the remaining ones of the other subject NPCs from the client devices operated by the designers. The graphics data of the some of the other subject NPCs is received with indications from the client devices operated by the designers that the some of the other subject NPCs have the graphics data within a first range. The first range is received by the tech check model with the some of the other subject NPCs from the client devices operated by the designers via the computer network 309. Also, the graphics data of the remaining ones of the other subject NPCs is received with indications from the client devices operated by the designers that the remaining ones of the other subject NPCs have the graphics data within a second range, which is exclusive of the first range of the graphics data. The second range is received by the tech check model with the remaining ones of the other subject NPCs from the client devices operated by the designers via the computer network 309. The first range of the graphics data is an example of the pre-learned graphics.

The validator 412 sets a confidence percentage of the subject NPC 406 based on results output from four models including the audio validator model, the appearance validator model, the animation model, and the tech check model. For example, upon determining that a predetermined number, such as a majority or three out of the four models output results that favor modification of the subject NPC 406 and remaining of the four models disfavor modification of the subject NPC 406, the validator 412 sets a low confidence percentage to apply to the subject NPC 406. As an example, upon determining that a preset number, such as a minority or one out of the four models output results that favor modification of the subject NPC 406 and remaining of the four models disfavor modification of the subject NPC 406, the validator 412 sets a high confidence percentage to apply to the subject NPC 406.

The validator 412 provides, to the processor system 308, an indication of whether the high confidence, such as the high confidence percentage, or the low confidence, such as the low confidence percentage, applies to the subject NPC 406. Upon receiving the indication that the high confidence applies to the subject NPC 406, the processor system 308 determines to include the subject NPC 406 within the video game.

On the other hand, upon receiving the indication that the low confidence applies to the subject NPC 406, the processor system 308 determines to modify the subject NPC 406, such as functionality or appearance or a combination thereof of the subject NPC 406, until the high confidence applies to the subject NPC 406. For example, upon determining that the interaction of the audio data between the NPCs 404 and 406 is of the bad quality, the processor system 308 modifies the functionality of the subject NPC 406 to achieve the good quality of interaction of audio data between the NPCs 404 and 406. To illustrate, the processor system 306 modifies the subject NPC 406 to satisfy the pre-learned grammatical rules, or to interact, using the audio data, with the test NPC 406 for greater than the pre-learned amount of time, or a combination thereof. As another example, upon determining that the morphology of the subject NPC 406 does not satisfy the pre-learned morphology, the processor system 306 modifies the subject NPC 406 to achieve the pre-learned morphology. To illustrate, the processor system 306 adds a fifth finger to the subject NPC 406 upon determining that the fifth finger is missing in the subject NPC 406. As another illustration, the processor system 306 generates data for displaying fingers of the subject NPC 406 to achieve the pre-learned morphology, such as a pre-learned order of locations of fingers on a hand of the subject NPC 406, upon determining that the fingers are out of order. Similarly, as yet another example, the processor system 306 modifies the subject NPC 406 to move in the non-erratic manner, or to achieve the pre-learned size, or to achieve the lack of latency in the movement of the subject NPC 406, or to achieve the lack of latency in the audio data output from the subject NPC 406, or to modify, such as increase or decrease, a number of polygons of the subject NPC 406 to achieve the pre-learned graphics, or a combination of two or more thereof.

As another example, the NPC-generator model 402 determines that the subject NPC 406 has the low confidence and modifies the subject NPC 406 to output a modified subject NPC having the high confidence. To illustrate, the NPC-generator model 402 modifies the audio output from the subject NPC 406 to having the good quality from having the bad quality, or modifies the subject NPC 406 to have the good appearance from having the bad appearance, or modifies the subject NPC 406 to not have the latency in movement from having the latency, or modifies the subject NPC 406 to not have the latency in the output of audio data from having the latency in the output of the audio data, or a combination of two or more thereof to output the modified subject NPC.

When input parameters similar to the input parameters 418 are received by the NPC-generation model 402 from a designer, such as the designer 1 or another designer, via a client device operated by the designer, the NPC-generation model 402 outputs the modified subject NPC instead of the subject NPC 406. An example of the input parameters similar to the input parameters 418 include a predetermined number, such as all or more than 90%, of the input parameters that are the same as, such as having the same values as, the input parameters 418. As such, the NPC-generation model 402 is refined over time.

In an embodiment, upon receiving the indication that the low confidence applies to the subject NPC 406, the processor system 308 determines to exclude the subject NPC 406 from the video game.

In one embodiment, upon receiving the indication that the low confidence applies to the subject NPC 406, the processor system 308 determines to include the subject NPC 406 in the video game to interact with the virtual character 206 (FIG. 2). The NPC-generation model 402 determines based on the interaction with the virtual character 206 whether the high confidence or the low confidence is to be assigned to the subject NPC 406 in the same manner in which the NPC-generation model 402 determines based on the interaction between the test NPC 404 and the subject NPC 406 whether the high confidence or the low confidence is to be assigned to the subject NPC 406. Upon determining that the high confidence is to be assigned to the subject NPC 406 based on the interaction between the subject NPC 406 and the virtual character 206, the processor system 308 continues to include the subject NPC 406 in additional instances of execution of the game program of the video game. Example of one of the additional instances includes an instance in which the user 1 logs into the user account 1 to access the video game after the interaction between the virtual character 206 and the subject NPC 104 (FIG. 2) during a previous instance of execution of the game program. On the other hand, in response to determining that the low confidence is to be assigned to the subject NPC 406 based on the interaction between the subject NPC 406 and the virtual character 206, the processor system 308 determines to exclude the subject NPC 406 from additional instances of execution of the game program of the video game or determines to continue to modify the subject NPC 406 based on the additional instances until the high confidence is achieved.

In an embodiment, the validator 412 is a portion of the NPC-generation model 402. For example, the validator 412 is integrated within the NPC-generation model 402.

FIG. 5 illustrates components of an example device 500, such as a client device or a server system, described herein, that can be used to perform aspects of the various embodiments of the present disclosure. This block diagram illustrates the device 500 that can incorporate or can be a personal computer, a smart phone, a video game console, a personal digital assistant, a server or other digital device, suitable for practicing an embodiment of the disclosure. The device 500 includes a CPU 502 for running software applications and optionally an operating system. The CPU 502 includes one or more homogeneous or heterogeneous processing cores. For example, the CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 500 can be a localized to a player, such as a user, described herein, playing a game segment (e.g., game console), or remote from the player (e.g., back-end server processor), or one of many servers using virtualization in a game cloud system for remote streaming of gameplay to clients.

A memory 504 stores applications and data for use by the CPU 502. A storage 506 provides non-volatile storage and other computer readable media for applications and data and may include fixed disk drives, removable disk drives, flash memory devices, compact disc-read only memory (CD-ROM), digital versatile disc-ROM (DVD-ROM), Blu-ray, high definition-digital versatile disc (HD-DVD), or other optical storage devices, as well as signal transmission and storage media. User input devices 508 communicate user inputs from one or more users to the device 500. Examples of the user input devices 508 include keyboards, mouse, joysticks, touch pads, touch screens, still or video recorders/cameras, tracking devices for recognizing gestures, and/or microphones. A network interface 514, such as a network interface controller (NIC), allows the device 500 to communicate with other computer systems via an electronic communications network, and may include wired or wireless communication over local area networks and wide area networks, such as the internet. An audio processor 512 is adapted to generate analog or digital audio output from instructions and/or data provided by the CPU 502, the memory 504, and/or data storage 506. The components of device 500, including the CPU 502, the memory 504, the data storage 506, the user input devices 508, the network interface 514, and an audio processor 512 are connected via a data bus 522.

A graphics subsystem 520 is further connected with the data bus 522 and the components of the device 500. The graphics subsystem 520 includes a graphics processing unit (GPU) 516 and a graphics memory 518. The graphics memory 518 includes a display memory (e.g., a frame buffer) used for storing pixel data for each pixel of an output image. The graphics memory 518 can be integrated in the same device as the GPU 516, connected as a separate device with the GPU 516, and/or implemented within the memory 504. Pixel data can be provided to the graphics memory 518 directly from the CPU 502. Alternatively, the CPU 502 provides the GPU 516 with data and/or instructions defining the desired output images, from which the GPU 516 generates the pixel data of one or more output images. The data and/or instructions defining the desired output images can be stored in the memory 504 and/or the graphics memory 518. In an embodiment, the GPU 516 includes three-dimensional (3D) rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from the graphics memory 518 to be displayed on the display device 510. The display device 510 can be any device capable of displaying visual information in response to a signal from the device 500, including a cathode ray tube (CRT) display, a liquid crystal display (LCD), a plasma display, and an organic light emitting diode (OLED) display. The device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via a head-mounted display (HMD). The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method comprising:

generating a set of parameters that define characteristics of a non-player character (NPC) for use in a video game, wherein the characteristics include data that define visual features for the NPC, physical features for the NPC, and context features for a test video game for the NPC;

providing the set of parameters to an artificial intelligence (AI) model trained for generating characters for use in games, wherein the AI model is configured to output an interactive version of the NPC, wherein the interactive version of the NPC includes interaction logic that defines a behavior mechanics for the NPC when activated;

activating the interactive version of the NPC in the test video game;

introducing a test NPC into the test video game, wherein the test NPC is programmed based on a subset of the set of parameters and performs an interaction with the interactive version of the NPC;

generating a metric based on the interaction, wherein the metric indicates a quality associated with the interaction; and modifying the interactive version of the NPC based on the metric.

2. The method of claim 1, wherein the visual features include graphics of the NPC, the physical features include behavioral functionality of the NPC, and the context features include a context that is compatible with the NPC.

3. The method of claim 1, wherein the behavior mechanics include a response of the interactive version of the NPC to an inquiry from the test NPC.

4. The method of claim 1, wherein said activating the interactive version includes placing the interactive version of the NPC in a game context of the test video game, wherein said introducing the test NPC into the test video game includes placing the test NPC into the game context of the test video game, wherein the test NPC is configured to initiate the interaction with the interactive version of the NPC.

5. The method of claim 1, wherein said modifying the interactive version of the NPC includes changing faulty graphics of the interactive version of the NPC, or faulty audio output from the interactive version of the NPC, or incompatibility of the interactive version of the NPC with a game environment, or faulty movement of the interactive version of the NPC, or a combination thereof.

6. The method of claim 5, further comprising generating a validation report indicating the faulty graphics, or the faulty audio output, or the incompatibility with the game environment, or the faulty movement, or the combination thereof.

7. The method of claim 1, further comprising including the NPC within the video game upon said modifying the interactive version of the NPC.

8. A server system comprising:

a processor a memory including instructions executable by the processor to cause the processor to:

generate a set of parameters that define characteristics of a non-player character (NPC) for use in a video game, wherein the characteristics include data that define visual features for the NPC, physical features for the NPC, and context features for a test video game for the NPC;

provide the set of parameters to an artificial intelligence (AI) model trained for generating characters for use in games, wherein the AI model is configured to output an interactive version of the NPC, wherein the interactive version of the NPC includes interaction logic that defines a behavior mechanics for the NPC when activated;

activate the interactive version of the NPC in the test video game;

introduce a test NPC into the test video game, wherein the test NPC is programmed based on a subset of the set of parameters and performs an interaction to interact with the interactive version of the NPC;

generate a metric based on the interaction, wherein the metric indicates a quality associated with the interaction; and modify the interactive version of the NPC based on the metric.

9. The server system of claim 8, wherein the visual features include graphics of the NPC, the physical features include behavioral functionality of the NPC, and the context features include a context that is compatible with the NPC.

10. The server system of claim 8, wherein the behavior mechanics include a response of the interactive version of the NPC to an inquiry from the test NPC.

11. The server system of claim 8, wherein to activate the interactive version, the processor is configured to place the interactive version of the NPC in a game context of the test video game, wherein to introduce the test NPC into the test video game, the processor is configured to place the test NPC into the game context of the test video game, wherein the test NPC is configured to initiate the interaction with the interactive version of the NPC.

12. The server system of claim 8, wherein to modify the interactive version of the NPC, the processor is configured to change faulty graphics of the interactive version of the NPC, or faulty audio output from the interactive version of the NPC, or incompatibility of the interactive version of the NPC with a game environment, or faulty movement of the interactive version of the NPC, or a combination thereof.

13. The server system of claim 12, wherein the processor is configured to generate a validation report indicating the faulty graphics, or the faulty audio output, or the incompatibility with the game environment, or the faulty movement, or the combination thereof.

14. The server system of claim 8, wherein the processor is configured to include the NPC within the video game in response to the modification of the interactive version of the NPC.

15. A non-transitory computer readable medium containing program instructions, wherein execution of the program instructions by one or more processors of a computer system causes the one or more processors to carry out operations of:

generating a set of parameters that define characteristics of a non-player character (NPC) for use in a video game, wherein the characteristics include data that define visual features for the NPC, physical features for the NPC, and context features for a test video game for the NPC;

providing the set of parameters to an artificial intelligence (AI) model trained for generating characters for use in games, wherein the AI model is configured to output an interactive version of the NPC, wherein the interactive version of the NPC includes interaction logic that defines a behavior mechanics for the NPC when activated;

activating the interactive version of the NPC in the test video game;

introducing a test NPC into the test video game, wherein the test NPC is programmed based on a subset of the set of parameters and performs an interaction with the interactive version of the NPC;

generating a metric based on the interaction, wherein the metric indicates a quality associated with the interaction; and modifying the interactive version of the NPC based on the metric.

16. The non-transitory computer readable medium of claim 15, wherein the visual features include graphics of the NPC, the physical features include behavioral functionality of the NPC, and the context features include a context that is compatible with the NPC.

17. The non-transitory computer readable medium of claim 15, wherein the behavior mechanics include a response of the interactive version of the NPC to an inquiry from the test NPC.

18. The non-transitory computer readable medium of claim 15, wherein the operation of activating the interactive version includes placing the interactive version of the NPC in a game context of the test video game, wherein said introducing the test NPC into the test video game includes placing the test NPC into the game context of the test video game, wherein the test NPC is configured to initiate the interaction with the interactive version of the NPC.

19. The non-transitory computer readable medium of claim 15, wherein the operation of modifying the interactive version of the NPC includes changing faulty graphics of the interactive version of the NPC, or faulty audio output from the interactive version of the NPC, or incompatibility of the interactive version of the NPC with a game environment, or faulty movement of the interactive version of the NPC, or a combination thereof.

20. The non-transitory computer readable medium of claim 19, wherein the operations further comprise generating a validation report indicating the faulty graphics, or the faulty audio output, or the incompatibility with the game environment, or the faulty movement, or the combination thereof.

* * * * *